United States Patent
Yue et al.

(10) Patent No.: US 11,368,961 B2
(45) Date of Patent: Jun. 21, 2022

(54) PROCESSING METHOD FOR SECONDARY CELL STATE TRANSITION AND COMMUNICATION DEVICE

(71) Applicant: VIVO MOBILE COMMUNICATION CO., LTD., Guangdong (CN)

(72) Inventors: Ran Yue, Chang'an Dongguan (CN); Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/959,921

(22) PCT Filed: Jan. 2, 2019

(86) PCT No.: PCT/CN2019/070066
§ 371 (c)(1),
(2) Date: Jul. 2, 2020

(87) PCT Pub. No.: WO2019/134640
PCT Pub. Date: Jul. 11, 2019

(65) Prior Publication Data
US 2021/0212068 A1 Jul. 8, 2021

(30) Foreign Application Priority Data
Jan. 4, 2018 (CN) .......................... 201810009118.9

(51) Int. Cl.
*H04W 72/04* (2009.01)
*H04B 7/0456* (2017.01)
(Continued)

(52) U.S. Cl.
CPC ...... *H04W 72/0493* (2013.01); *H04B 7/0486* (2013.01); *H04B 7/0626* (2013.01);
(Continued)

(58) Field of Classification Search
CPC ............. H04W 72/0493; H04W 76/27; H04W 72/0413; H04W 80/02; H04W 52/02;
(Continued)

(56) References Cited

U.S. PATENT DOCUMENTS 10,660,091 B2 * 5/2020 Huang ................. H04L 5/0098
2016/0309417 A1 * 10/2016 Han ................. H04W 74/0833
(Continued)

FOREIGN PATENT DOCUMENTS

| CN | 102769903 A | 11/2012 |
| CN | 105991212 A | 10/2016 |

(Continued)

OTHER PUBLICATIONS

Chinese Office Action issued in corresponding application No. 201810009118.9, dated Dec. 31, 2019.
(Continued)

*Primary Examiner* — Harry H Kim
(74) *Attorney, Agent, or Firm* — Maschoff Brennan

(57) ABSTRACT

A processing method for secondary cell state transition and a communication device are provided. The method includes: acquiring state indication information of a secondary cell; and determining whether a state transition of a secondary cell configured with PUCCH resources to a third state is permitted based on the state indication information, or determining whether a configuration of PUCCH resources for a secondary cell in the third state is permitted based on the state indication information.

20 Claims, 11 Drawing Sheets

(51) Int. Cl.
| | |
|---|---|
| *H04B 7/06* | (2006.01) |
| *H04W 76/27* | (2018.01) |
| *H04W 80/02* | (2009.01) |
| *H04W 52/02* | (2009.01) |
| *H04L 5/00* | (2006.01) |
| *H04W 72/08* | (2009.01) |

(52) U.S. Cl.
CPC ......... *H04B 7/0632* (2013.01); *H04B 7/0639* (2013.01); *H04W 72/0413* (2013.01); *H04W 76/27* (2018.02); *H04W 80/02* (2013.01)

(58) Field of Classification Search
CPC . H04W 72/085; H04B 7/0486; H04B 7/0626; H04B 7/0632; H04B 7/0639; H04L 5/00; H04L 5/0057
See application file for complete search history.

(56) References Cited

U.S. PATENT DOCUMENTS

| | | | | |
|---|---|---|---|---|
| 2016/0330697 | A1* | 11/2016 | Chen | ............. H04W 76/15 |
| 2018/0049186 | A1 | 2/2018 | Hong et al. | |
| 2018/0199315 | A1* | 7/2018 | Hong | ............. H04L 1/1867 |
| 2019/0149380 | A1* | 5/2019 | Babaei | ............. H04W 72/1268 370/330 |
| 2020/0314745 | A1* | 10/2020 | Yi | ............. H04W 72/14 |

FOREIGN PATENT DOCUMENTS

| | | |
|---|---|---|
| CN | 106160975 A | 11/2016 |
| CN | 107431592 A | 12/2017 |

OTHER PUBLICATIONS

PCT International Search Report and Written Opinion issued in corresponding application No. PCT/CN2019/070066, dated Jul. 16, 2020.

Qualcomm Inc, AT&T, Fast SCell Activation for Enhanced CA Utilization, 3GPP Draft, TSG-Ran2 Meeting #100, Reno, USA, Nov. 27-Dec. 1, 2017, R2-1712255.

Nokia, Nokia Shanghai Bell, Running MAC CR for euCA, 3GPP Draft, TSG-RAN WG2 #100, Reno, USA, Nov. 27-Dec. 1, 2017, R2-1714288.

Nokia, Nokia Shanghai Bell, Running CR for EuCA Stage-2, 3GPP Draft, TSG-RAN WG2 #100, Reno, USA, Nov. 27-Dec. 1, 2017, R2-1714289.

Vivo, Consideration on PUCCH-SCell, in the Dormant Scell State, 3GPP Draft, TSG-RAN WG2 #101, Sanya, China, Apr. 16-20, 2018, R2-1804687.

Vivo, Consideration on PUCCH-SCell, in the Dormant Scell State, 3GPP Draft, TSG-RAN WG2 #102, Busan, Korea, May 21-25, 2018, R2-1807580.

* cited by examiner

PROCESSING METHOD FOR SECONDARY CELL STATE TRANSITION AND COMMUNICATION DEVICE

CROSS-REFERENCE TO RELATED APPLICATION

The present application is a U.S. national phase application of a PCT Application No. PCT/CN2019/070066 filed on Jan. 2, 2019, which claims a priority to the Chinese patent application No. 201810009118.9 filed in China on Jan. 4, 2018, disclosures of which are incorporated herein by reference in their entireties.

TECHNICAL FIELD

The present disclosure relates to the field of communication techniques, in particular to a processing method for secondary cell state transition and a communication device.

BACKGROUND

Carrier aggregation techniques have been introduced into Long Term Evolution (LTE) systems. In carrier aggregation techniques, user equipment (UE) is capable of establishing communication connections via multiple cells and networks. One of the cells is a primary cell (PCell) and the rest are secondary cells (SCells). The SCells are either in an activated state or a deactivated state, and the PCell is always in the activated state.

The SCell activation/deactivation mechanism is typically implemented based on an activation/deactivation medium access control (MAC) control element or deactivation timer. In the SCell activation or deactivation mechanism, substantial latency may occur in the transition between the activated state and the deactivated state. To reduce this latency, a third SCell state (new fast SCell activated state (SCell new state for short)) has been introduced into LTE. As appreciated by those skilled in the art, this third state may be called a third status or new state, or another term known by those skilled in the art, but the term itself is not limitative. In one case, the third state may be understood as an intermediate state between the activated state and the deactivated state. In brief, in the third state, periodic channel quality indication (CQI) reporting based on cell reference signal (CRS) is permitted, and physical downlink control channel (PDCCH) is not monitored.

However, no solution is provided to the problem of whether an SCell configured with PUCCH resources is permitted to enter the third state or the problem of whether it is permitted to configure PUCCH resources to an SCell in the third state. As such, due to lack of such a solution, after the third state is introduced, the problem of poor compatibility is caused in the communication system.

SUMMARY

In a first aspect, the present disclosure provides, in some embodiments, a processing method for secondary cell state transition applied to user equipment (UE). The processing method for secondary cell state transition includes: acquiring state indication information of a secondary cell; and determining whether a state transition of a secondary cell configured with physical uplink control channel (PUCCH) resources to a third state is permitted based on the state indication information, or determining whether a configuration of PUCCH resources for a secondary cell in the third state is permitted based on the state indication information.

In a second aspect, the present disclosure provides, in some embodiments, a processing method for secondary cell state transition applied to a network-side device. The processing method for secondary cell state transition includes: configuring a state transition signaling, where the state transition signaling is used for the state transition of a secondary cell to a third state or for configuring PUCCH resources for a secondary cell in the third state; transmitting the state transition signaling to UE.

In a third aspect, the present disclosure provides, in some embodiments, UE. The UE includes: an acquisition module, configured to acquire state indication information of a secondary cell; and a determination module, configured to determine whether a state transition of a secondary cell configured with PUCCH resources to a third state is permitted based on the state indication information; or configured to determine whether a configuration of PUCCH resources for a secondary cell in the third state is permitted based on the state indication information.

In a fourth aspect, the present disclosure provides, in some embodiments, a network-side device. The network-side device includes: a configuration module, configured to configure a state transition signaling, where the state transition signaling is used for the state transition of a secondary cell to a third state or for configuring PUCCH resources for a secondary cell in the third state; a transmission module, configured to transmit the state transition signaling to UE.

In a fifth aspect, the present disclosure provides, in some embodiments, user equipment (UE). The UE includes: a storage, a processor, and a computer program stored in the storage and configured to be executed by the processor, where the processor is configured to execute the computer program, to implement steps in the processing method for secondary cell state transition corresponding to UE according to embodiments of the present disclosure.

In a sixth aspect, the present disclosure provides, in some embodiments, a network-side device. The network-side device includes: a storage, a processor, and a computer program stored in the storage and configured to be executed by the processor, where the processor is configured to execute the computer program, to implement steps in the processing method for secondary cell state transition corresponding to a network-side device according to embodiments of the present disclosure.

In a seventh aspect, the present disclosure provides, in some embodiments, a computer readable storage medium storing therein a computer program, where the computer program is configured to be executed by a processor, to implement steps in the processing method for secondary cell state transition corresponding to a network-side device or steps in the processing method for secondary cell state transition corresponding to UE according to embodiments of the present disclosure.

BRIEF DESCRIPTION OF THE DRAWINGS

In order to explain the technical solutions of embodiments of the present disclosure more clearly, the drawings needed in description of the embodiments of the present disclosure will be introduced briefly below. Obviously, the drawings in the following description are only some embodiments of the present disclosure. Other drawings can also be obtained based on these drawings by those of ordinary skill in the art without any creative efforts.

DETAILED DESCRIPTION

The technical solutions in the embodiments of the present disclosure will be described clearly and completely in conjunction with the drawings in the embodiments of the present disclosure. Obviously, the embodiments described are some of the embodiments of the present disclosure, but not all the embodiments. Based on the embodiments in the present disclosure, all other embodiments obtained by a person of ordinary skill in the art without creative efforts shall fall within the scope of the present disclosure.

Figure 1:
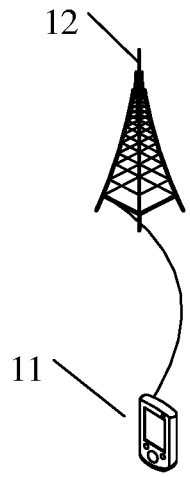
FIG. 1 is a structural view of a processing system for secondary cell state transition according to one or more embodiments of the present disclosure.

FIG. 1 is a structural view of a processing system for secondary cell state transition according to one or more embodiments of the present disclosure. As shown in FIG. 1, the processing system includes user equipment (UE) 11 and a network-side device 12. The UE 11 may be a mobile communication terminal, for example, terminal-side equipment, such as a cell phone, a tablet personal computer, a laptop computer, a personal digital assistant (PDA), a mobile Internet device (MID), a wearable device. It is to be noted that the specific type of the UE 11 is not limited in embodiments of the present disclosure. The network-side device 12 may be a 5G network-side device, such as a gNB or a 5G NR NB, or a fourth generation (4G) network-side device, such as an evolved NodeB (eNB), or a third generation (3G) network-side device, such as an NB, or the like. It is to be noted that the specific type of the network-side device 12 is not limited in embodiments of the present disclosure.

In an embodiment of the present disclosure, the UE acquires state indication information of a secondary cell; and determines whether a state transition of a secondary cell configured with physical uplink control channel (PUCCH) resources to a third state is permitted based on the state indication information; or determines whether a configuration of PUCCH resources for a secondary cell in the third state is permitted based on the state indication information.

The state indication information includes four possible cases, namely, the state indication information is used for determining that a transition of the state of a secondary cell configured with PUCCH resources to a third state is not permitted; or the state indication information is used for determining that a configuration of PUCCH resources for a secondary cell in the third state is not permitted; or the state indication information is used for determining that the state transition of a secondary cell configured with PUCCH resources to a third state is permitted; or the state indication information is used for determining that the configuration of PUCCH resources for a secondary cell in the third state is permitted.

The state indication information may be information that specified according to a protocol, or information configured at a higher layer. No limitation is made thereto in embodiments of the present disclosure.

It is to be noted that, the third state of a secondary cell is a secondary cell state newly introduced in the LTE system. This new state is introduced in the LTE system because there is substantial latency in the transition from the deactivated state to the activated state of the secondary cell, and this state is introduced so as to reduce this latency. This new state is defined in the LTE system as a new fast SCell activated state, SCell new state for short. The SCell new state is an intermediate state between the activated state and the deactivated state. For the LTE system, it is agreed that: in the SCell new state, no L1 signaling is to be introduced for a state transition; periodic CQI reporting based on CRS is permitted, PDCCH is not to be monitored; and both a transition between the SCell new state and the activated state and a transition between the SCell new state and the deactivated state can be controlled by MAC CEs.

Further, in future communication systems, for example, in 5th-generation (5G) New Radio (NR) systems, nomenclature of the third state of the secondary cell is not limited. For example, it can be named as a new state, an SCell new state, an intermediary state, or the like.

In an embodiment of the present disclosure, on the basis of the state indication information, it is determined whether a transition of the state of a secondary cell configured with PUCCH resources to a third state is permitted, and it is determined whether a configuration of PUCCH resources for a secondary cell in the third state is permitted. As such, after the third state is introduced, it is possible to reduce the latency occurring during the transition of the secondary cell between the activated state and the deactivated state, and after the third state is introduced, the compatibility of the communication system is improved.

To make the technical solutions of embodiments of the present disclosure more understandable, the four possible cases are described in detail hereinafter in respective embodiments.

Figure 2:
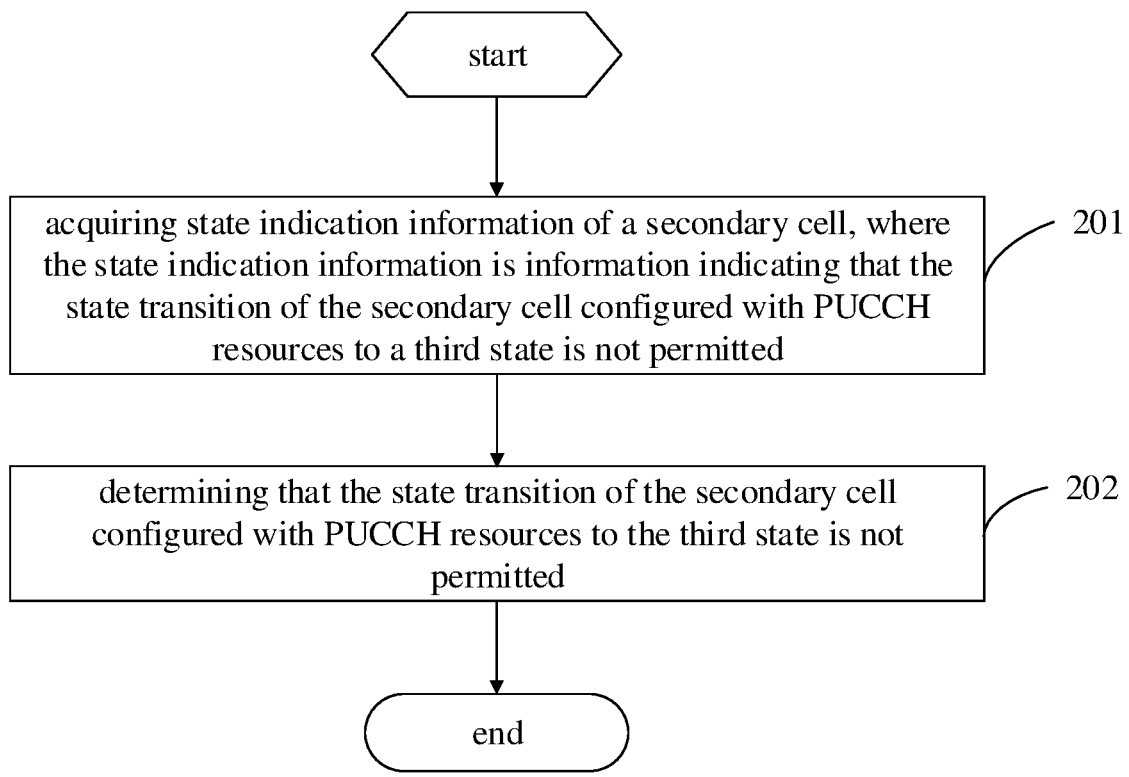
FIG. 2 is a flowchart of a processing method for secondary cell state transition according to one or more embodiments of the present disclosure.

FIG. 2 is a flowchart of a processing method for secondary cell state transition according to one or more embodiments of the present disclosure. As shown in FIG. 2, the processing method for secondary cell state transition applied to UE includes the following steps: a step 201 of acquiring state indication information of a secondary cell, where the state indication information is information indicating that the state transition of the secondary cell configured with PUCCH resources to a third state is not permitted; and a step 202 of determining that the state transition of the secondary cell configured with PUCCH resources to the third state is not permitted.

In an embodiment of the present disclosure, by specifying in the state indication information of the secondary cell that the state transition of the secondary cell configured with PUCCH resources to the third state is not permitted, it is determined that the state transition of the secondary cell configured with PUCCH resources to a third state is not permitted.

On the basis of an embodiment of the present disclosure, a detailed description as to what operations UE will perform, if the UE receives configuration information or signaling configured by the network-side device that requires a transition of the state of the secondary cell configured with PUCCH resources to the third state, is given hereinafter.

Optionally, subsequent to the step of determining that the state transition of the secondary cell configured with PUCCH resources to a third state is not permitted, the method further includes: if the state transition signaling configured by the network-side device or timer information for controlling the state transition of the secondary cell to the third state is received, ignoring the state transition signaling or the timer information; where the state transition signaling is used for the state transition of a first secondary cell to the third state, and the first secondary cell is a secondary cell configured with PUCCH resources.

As it is predetermined that the state transition of the secondary cell configured with PUCCH resources to a third state is not permitted, in this implementation, if the UE still receives relevant configuration information or signaling requiring the state transition of the secondary cell configured with PUCCH resources to a third state, the UE can ignore the configuration information or signaling.

Further, the UE can transmit feedback information indicative of configuration error to the network-side device. Specifically, the UE can transmit to the network-side device feedback information indicative of a configuration error of state transition information.

Further, the feedback information includes any one of a radio resource control (RRC) message, an MAC CE, or an uplink L1 control signaling.

In an embodiment of the present disclosure, by specifying in the state indication information of the secondary cell that the state transition of a secondary cell configured with PUCCH resources to a third state is not permitted, it is determined that the state transition of the secondary cell configured with PUCCH resources to the third state is not permitted. Further, a specific processing scheme for the UE when the UE receives the state transition signaling or timer information from the network-side device is also provided.

Figure 3:
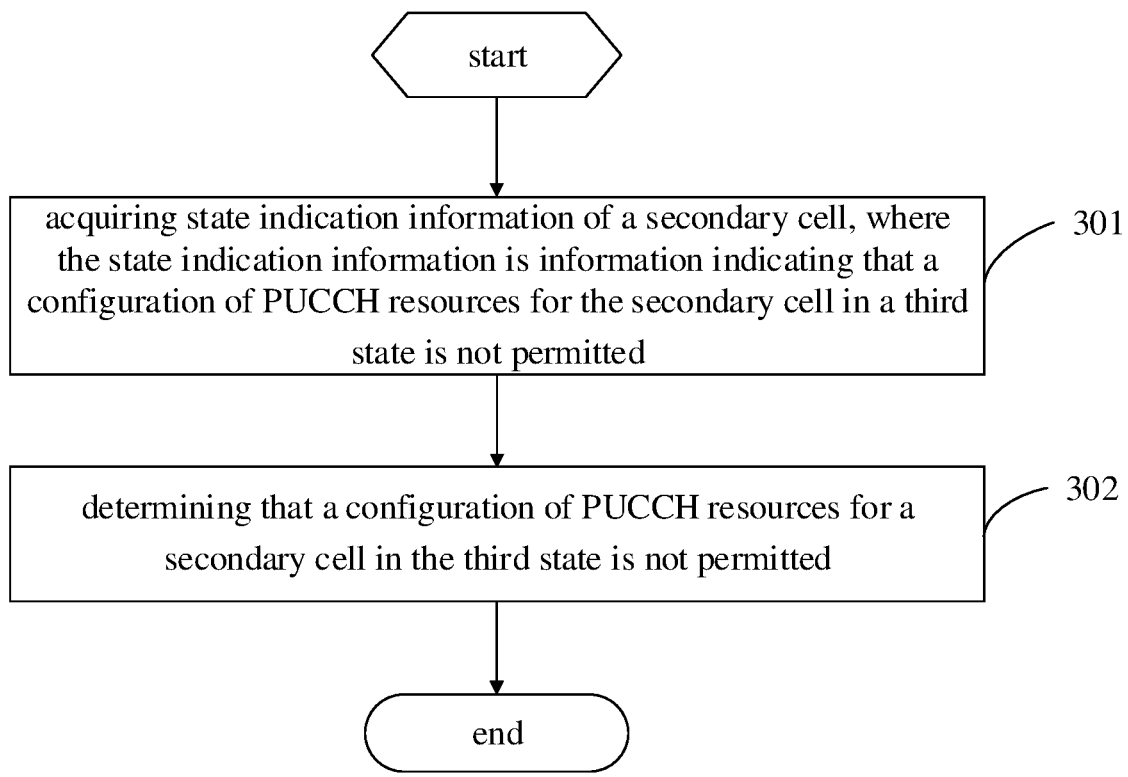
FIG. 3 is another flowchart of a processing method for secondary cell state transition according to one or more embodiments of the present disclosure.

FIG. 3 is another flowchart of a processing method for secondary cell state transition according to one or more embodiments of the present disclosure. As shown in FIG. 3, a processing method for secondary cell state transition applied to UE includes the following steps: a step 301 of acquiring state indication information of a secondary cell, where the state indication information is information indicating that a configuration of PUCCH resources for the secondary cell in a third state is not permitted; and a step 302 of determining that a configuration of PUCCH resources for a secondary cell in the third state is not permitted.

In an embodiment of the present disclosure, by specifying in the state indication information of the secondary cell that the configuration of PUCCH resources for the secondary cell in a third state is not permitted, it is determined that a configuration of PUCCH resources for a secondary cell in the third state is not permitted.

On the basis of an embodiment of the present disclosure, a detailed description as to what operations UE will perform, if the UE receives configuration information or signaling configured by the network-side device that requires a configuration of PUCCH resources for a secondary cell in the third state, is given hereinafter.

Optionally, subsequent to the step of determining that a configuration of PUCCH resources for a secondary cell in the third state is not permitted, the method further includes: if the resource configuration signaling configured by the network-side device is received, ignoring the resource configuration signaling; where the resource configuration signaling is used for configuring PUCCH resources for a second secondary cell, and the second secondary cell is a secondary cell that is in the third state and is not configured with PUCCH resources.

As it is predetermined that a configuration of PUCCH resources for a secondary cell in the third state is not permitted, in this implementation, if the UE still receives resource configuration signaling for configuring PUCCH resources for a secondary cell in the third state, the UE can ignore the resource configuration signaling.

Here, the configuration of PUCCH resources for a secondary cell in the third state may include configuring PUCCH resources for the secondary cell while the state of the secondary cell is configured as the third state; or configuring PUCCH resources for the secondary cell after the state of the secondary cell is configured as the third state.

Further, the UE can transmit feedback information indicative of a configuration error to the network-side device. Specifically, the UE can transmit to the network-side device feedback information indicative of a configuration error of a resource configuration signaling.

Further, the feedback information includes any one of an RRC message, an MAC CE, or an uplink L1 control signaling.

In an embodiment of the present disclosure, by specifying in the state indication information of the secondary cell that the configuration of PUCCH resources for the secondary cell in a third state is not permitted, it is determined that a configuration of PUCCH resources for a secondary cell in the third state is not permitted. Further, a specific processing scheme for the UE when the UE receives a resource configuration signaling from the network-side device is also provided.

Figure 4:
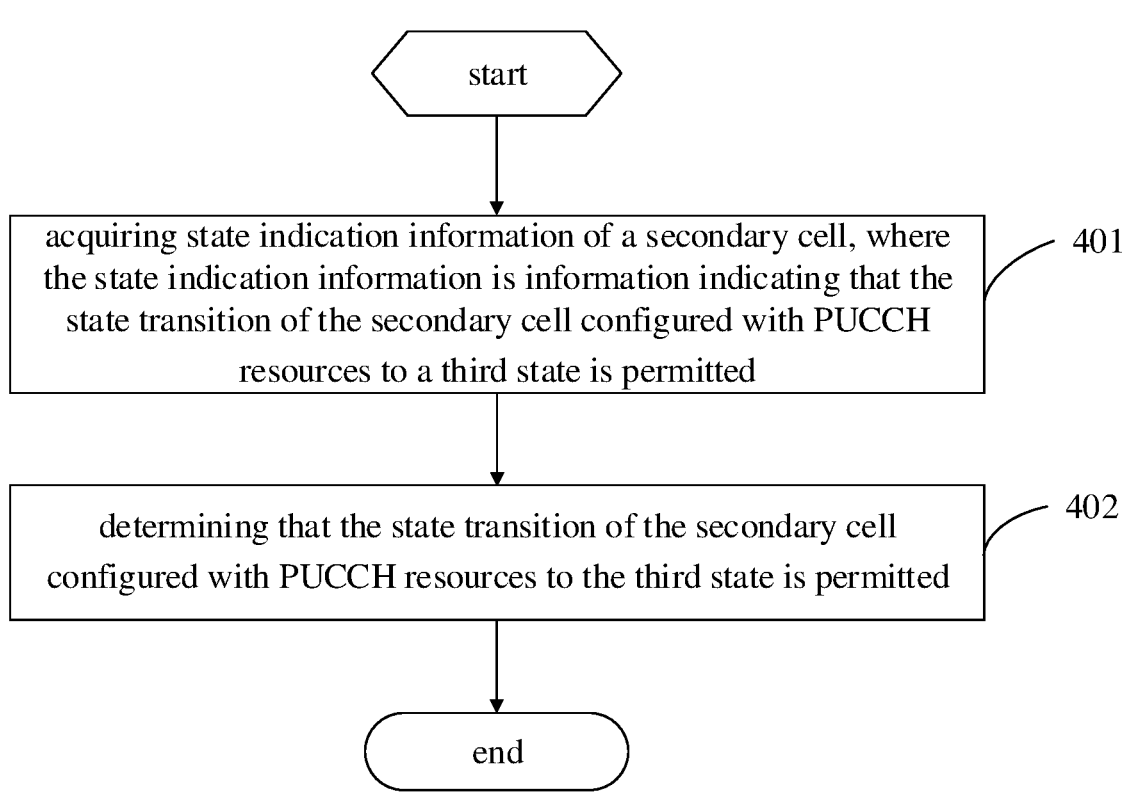
FIG. 4 is yet another flowchart of a processing method for secondary cell state transition according to one or more embodiments of the present disclosure.

FIG. 4 is yet another flowchart of a processing method for secondary cell state transition according to one or more embodiments of the present disclosure. As shown in FIG. 4, a processing method for secondary cell state transition applied to UE includes the following steps: a step 401 of acquiring state indication information of a secondary cell, where the state indication information is information indicating that the state transition of the secondary cell configured with PUCCH resources to a third state is permitted; and a step 402 of determining that the state transition of the secondary cell configured with PUCCH resources to the third state is permitted.

In an embodiment of the present disclosure, by specifying in the state indication information of the secondary cell that the state transition of the secondary cell configured with PUCCH resources to the third state is permitted, it is determined that the state transition of the secondary cell configured with PUCCH resources to a third state is permitted.

On the basis of an embodiment of the present disclosure, a detailed description as to what operations UE will perform, if the UE receives configuration information or signaling configured by the network-side device that requires a transition of the state of the secondary cell configured with PUCCH resources to the third state, is given hereinafter.

Optionally, subsequent to the step of determining that the state transition of the secondary cell configured with PUCCH resources to the third state is permitted, the method further includes: if the state transition signaling configured by the network-side device or the timer information for controlling the state transition of the secondary cell to the third state is received, performing the state transition of the third secondary cell to the third state; where the state transition signaling is used for the state transition of a third secondary cell to the third state, and the third secondary cell is a secondary cell configured with PUCCH resources.

As it is predetermined that the state transition of the secondary cell configured with PUCCH resources to a third state is permitted, in this implementation, if the UE receives a state transition signaling or timer information requiring a transition of the state of the secondary cell configured with PUCCH resources to the third state, the UE can perform the state transition of the secondary cell to the third state based on the state transition signaling or timer information.

Further, subsequent to the step of performing the state transition of the third secondary cell to the third state, the method further includes: releasing the PUCCH resources configured for the third secondary cell; or releasing the PUCCH resources configured for the third secondary cell based on a PUCCH resources release indication transmitted by the network-side device.

Further, subsequent to the step of releasing the PUCCH resources configured for the third secondary cell, the method further includes: transmitting at least one of a channel quality indicator (CQI), a precoding matrix indicator (PMI), a rank indicator (RI), a payload type identifier (PTI), or a CSI-RS Resource Indicator (CRI) report on a default physical channel; or transmitting at least one of an acknowledgement signal (ACK) or a negative acknowledgement signal (NACK) on a default physical channel; or transmitting an uplink scheduling request (SR) on a default physical channel.

Optionally, subsequent to the step of performing the state transition of the third secondary cell to the third state, the method further includes: stopping transmitting at least one of an ACK, a NACK, or an SR over the PUCCH resources configured for the third secondary cell; or transmitting periodically at least one of a CQI, a PMI, an RI, a PTI, or a CRI over the PUCCH resources configured for the third secondary cell.

Further, the step of transmitting periodically at least one of the CQI, the PMI, the RI, the PTI, or the CRI over the PUCCH resources configured for the third secondary cell further includes: when an on duration timer is running, or when an MAC entity is activated, transmitting periodically at least one of the CQI, the PMI, the RI, the PTI, or the CRI over the PUCCH resources configured for the third secondary cell.

Further, subsequent to the step of performing the state transition of the third secondary cell to the third state, the method further includes: transmitting at least one of the ACK or the NACK on a default physical channel; or transmitting the SR on a default physical channel.

In an embodiment of the present disclosure, by specifying in the state indication information of the secondary cell that the state transition of a secondary cell configured with PUCCH resources to a third state is permitted, it is determined that the state transition of the secondary cell configured with PUCCH resources to the third state is permitted. Further, a specific processing scheme for the UE when the UE receives the state transition signaling or timer information from the network-side device is also provided.

Figure 5:
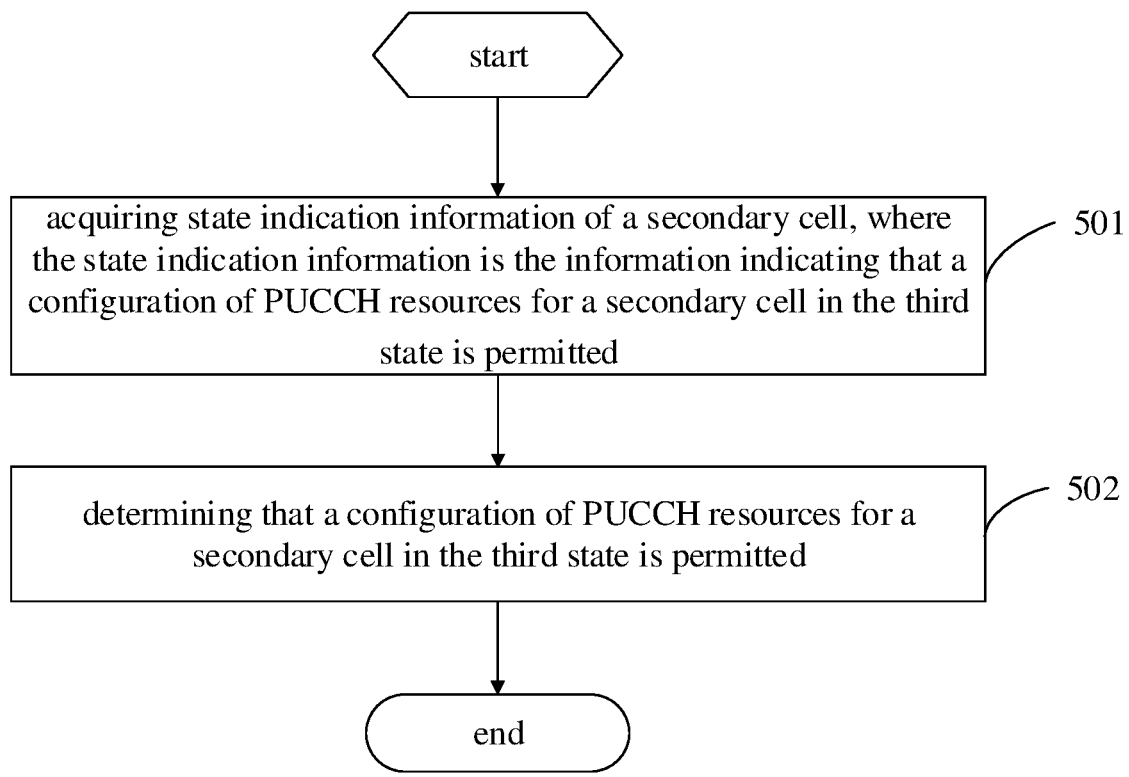
FIG. 5 is still another flowchart of a processing method for secondary cell state transition according to one or more embodiments of the present disclosure.

FIG. 5 is still another flowchart of a processing method for secondary cell state transition according to one or more embodiments of the present disclosure. As shown in FIG. 5, a processing method for secondary cell state transition applied to UE includes the following steps: a step 501 of acquiring state indication information of a secondary cell, where the state indication information is the information indicating that a configuration of PUCCH resources for a secondary cell in the third state is permitted; and a step 502 of determining that a configuration of PUCCH resources for a secondary cell in the third state is permitted.

In an embodiment of the present disclosure, by specifying in the state indication information of the secondary cell that the configuration of PUCCH resources for the secondary cell in a third state is permitted, it is determined that a configuration of PUCCH resources for a secondary cell in the third state is permitted.

On the basis of an embodiment of the present disclosure, a detailed description as to what operations UE will perform, if the UE receives configuration information or signaling configured by the network-side device that requires a configuration of PUCCH resources for a secondary cell in the third state, is given hereinafter.

Optionally, subsequent to the step of determining that a configuration of PUCCH resources for a secondary cell in the third state is permitted, the method further includes: if the resource configuration signaling configured by the network-side device is received, configuring PUCCH resources for a fourth secondary cell; where the resource configuration signaling is used for configuring PUCCH resources for the fourth secondary cell, and the fourth secondary cell is a secondary cell that is in the third state and is not configured with PUCCH resources.

As it is predetermined that a configuration of PUCCH resources for a secondary cell in the third state is permitted, in this implementation, if the UE receives a resource configuration signaling for configuring PUCCH resources for a secondary cell in the third state, the UE can configure PUCCH resources to the secondary cell in the third state based on the resource configuration information.

Further, subsequent to the step of configuring PUCCH resources for the fourth secondary cell, the method further includes: transmitting periodically at least one of a CQI, a PMI, an RI, a PTI, or a CRI over the PUCCH resources configured for the fourth secondary cell.

Further, the step of transmitting periodically at least one of the CQI, the PMI, the RI, the PTI, or the CRI over the PUCCH resources configured for the fourth secondary cell further includes: when an on duration timer is running, or when an MAC entity is activated, transmitting periodically at least one of the CQI, the PMI, the RI, the PTI, or the CRI over the PUCCH resources configured for the fourth secondary cell.

In an embodiment of the present disclosure, by specifying in the state indication information of the secondary cell that the configuration of PUCCH resources for the secondary cell in a third state is permitted, it is determined that a configuration of PUCCH resources for a secondary cell in the third state is permitted. Further, a specific processing scheme for the UE when the UE receives a resource configuration signaling from the network-side device is also provided.

Figure 6:
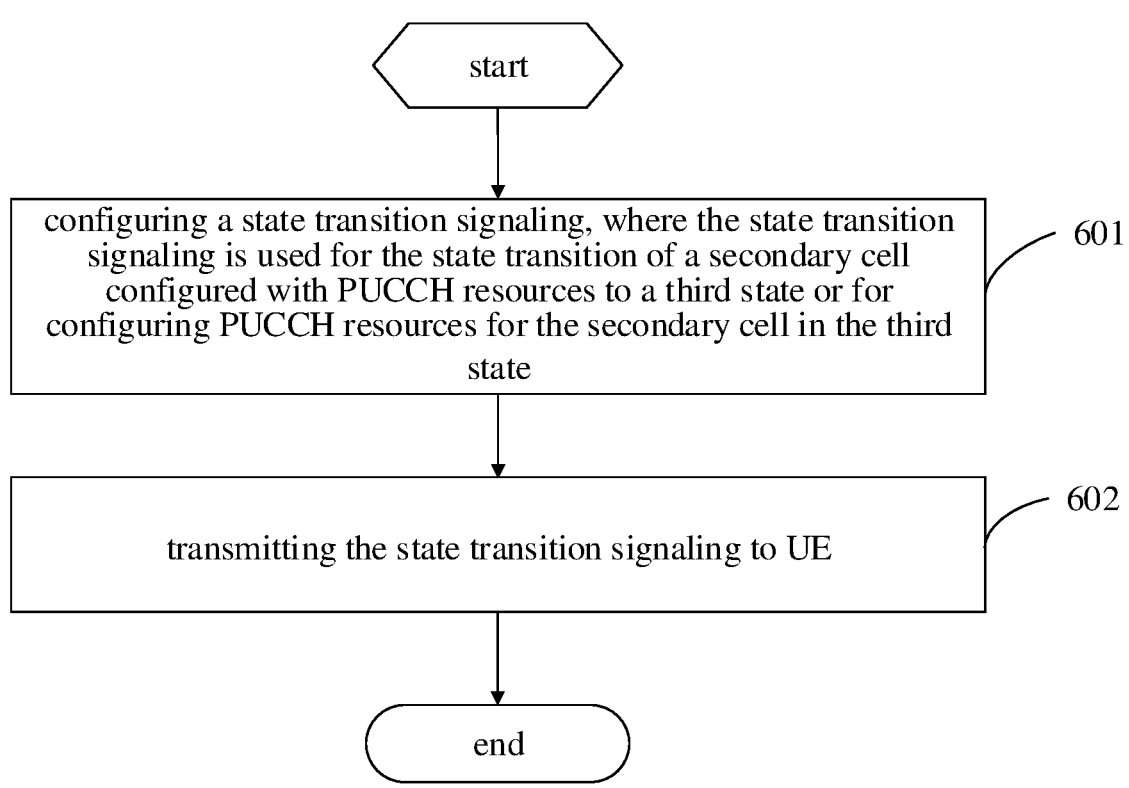
FIG. 6 is still another flowchart of a processing method for secondary cell state transition according to one or more embodiments of the present disclosure.

FIG. 6 is still another flowchart of a processing method for secondary cell state transition according to one or more embodiments of the present disclosure. As shown in FIG. 6, a processing method for secondary cell state transition applied to a network-side device includes the following steps: a step 601 of configuring a state transition signaling, where the state transition signaling is used for the state transition of a secondary cell configured with PUCCH resources to a third state or for configuring PUCCH resources for the secondary cell in the third state; and a step 602 of transmitting the state transition signaling to UE.

Figure 7:
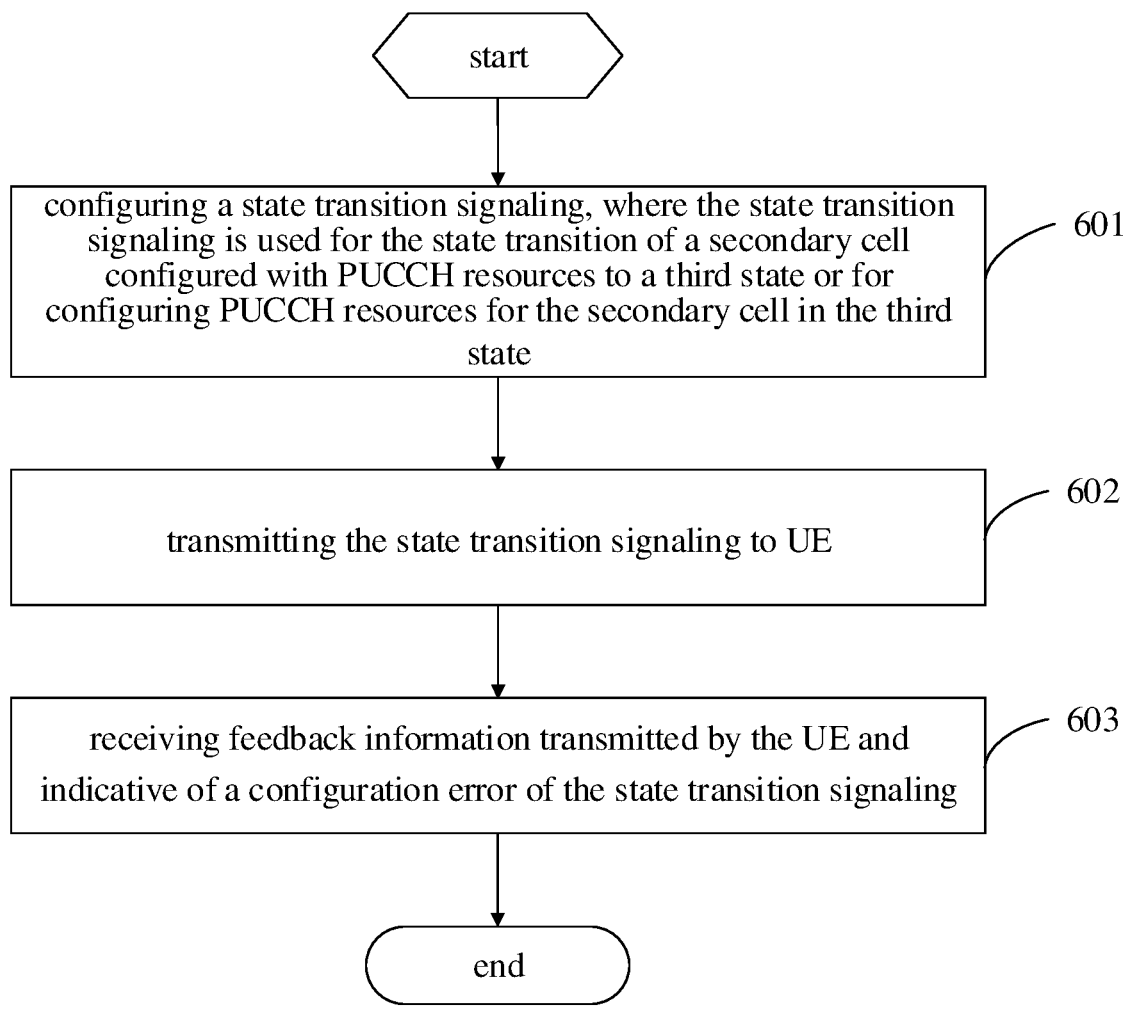
FIG. 7 is still another flowchart of a processing method for secondary cell state transition according to one or more embodiments of the present disclosure.

Optionally, as shown in FIG. 7, subsequent to the step 602, the method further includes a step 603 of receiving feedback information transmitted by the UE and indicative of a configuration error of the state transition signaling.

Figure 8:
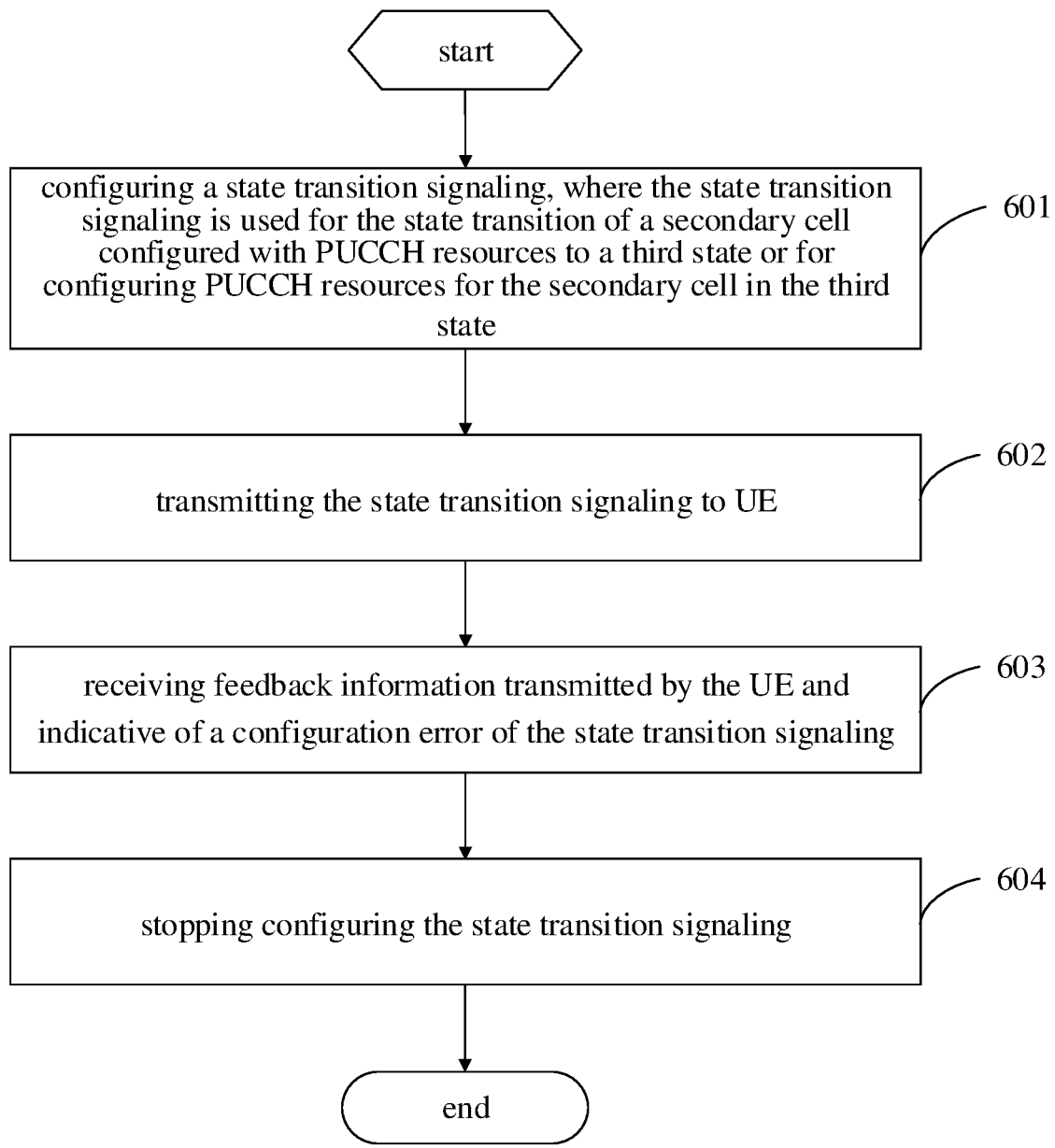
FIG. 8 is still another flowchart of a processing method for secondary cell state transition according to one or more embodiments of the present disclosure.

Optionally, as shown in FIG. 8, subsequent to the step 603, the method further includes a step 604 of stopping configuring the state transition signaling.

It is noted that, for specific implementations of embodiments of the present disclosure which are embodiments of a network-side device corresponding to the embodiments as shown in FIG. 2 to FIG. 5, references may be made to relevant descriptions of the embodiments as shown in FIG. 2 to FIG. 5, and these embodiments can achieve the same beneficial effects as the embodiments shown in FIG. 2 to FIG. 5. Description thereof will be omitted herein to avoid redundancy.

Figure 9:
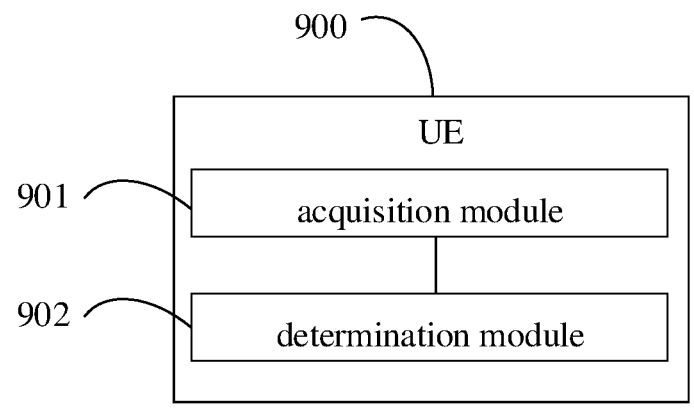
FIG. 9 is a structural view of UE according to one or more embodiments of the present disclosure.

FIG. 9 is a structural view of UE according to one or more embodiments of the present disclosure. As shown in FIG. 9, UE 900 includes: an acquisition module 901, configured to acquire state indication information of a secondary cell; and a determination module 902, configured to determine whether a transition of the state of the secondary cell configured with PUCCH resources to a third state is permitted based on the state indication information, or determine whether a configuration of PUCCH resources for a secondary cell in the third state is permitted based on the state indication information.

Optionally, in case that the state indication information is information indicating that the state transition of the secondary cell configured with PUCCH resources to the third state is not permitted, the determination module is specifically configured to determine that the state transition of the secondary cell configured with PUCCH resources to the third state is not permitted.

Figure 10:
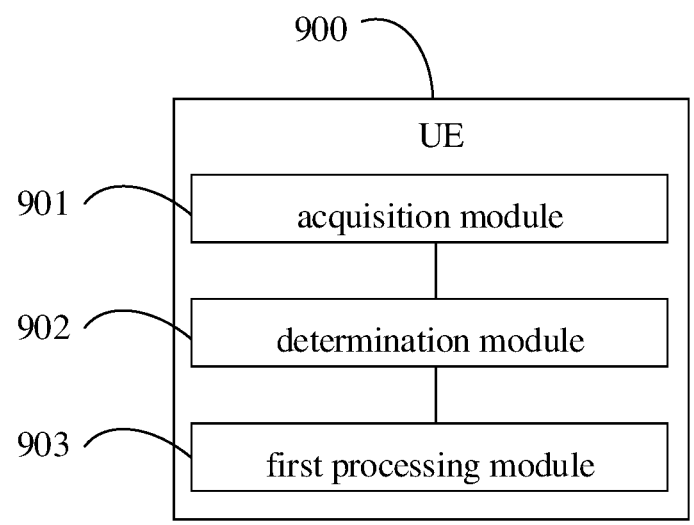
FIG. 10 is another structural view of UE according to one or more embodiments of the present disclosure.

Optionally, as shown in FIG. 10, the UE 900 further includes a first processing module 903 configured to: after determining that the state transition of the secondary cell configured with PUCCH resources to the third state is not permitted, if the state transition signaling configured by the network-side device or timer information for controlling the state transition of the secondary cell to the third state is received, ignore the state transition signaling or the timer information; where the state transition signaling is used for the state transition of a first secondary cell to the third state, and the first secondary cell is a secondary cell configured with PUCCH resources.

Optionally, in case that the state indication information is information indicating that a configuration of PUCCH resources for a secondary cell in the third state is not permitted, the determination module 902 is specifically configured to determine that a configuration of PUCCH resources for a secondary cell in the third state is not permitted.

Figure 11:
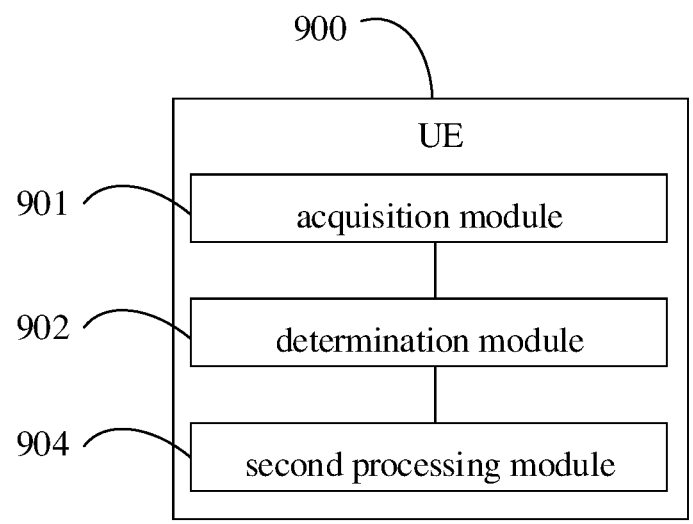
FIG. 11 is yet another structural view of UE according to one or more embodiments of the present disclosure.

Optionally, as shown in FIG. 11, the UE 900 further includes a second processing module 904 configured to: after determining that a configuration of PUCCH resources for a secondary cell in the third state is not permitted, if the resource configuration signaling configured by the network-side device is received, ignore the resource configuration signaling; where the resource configuration signaling is used for configuring PUCCH resources for a second secondary cell, and the second secondary cell is a secondary cell that is in the third state and is not configured with PUCCH resources.

Figure 12:
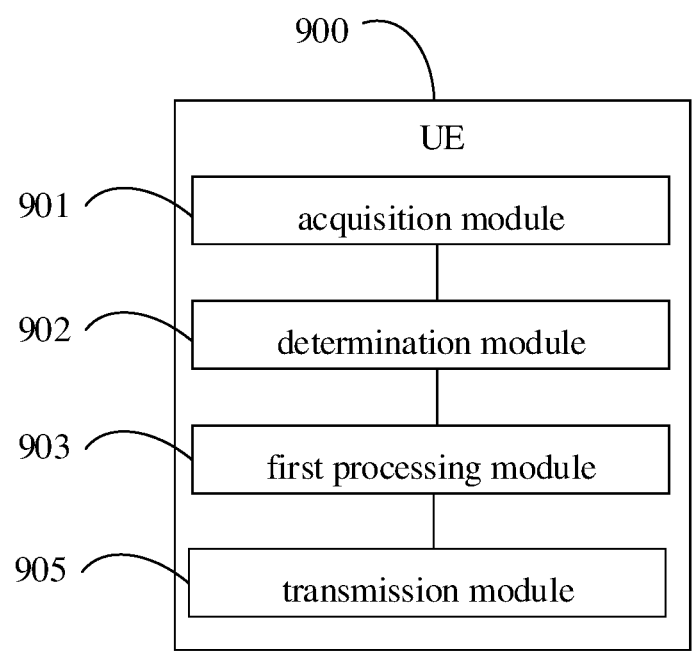
FIG. 12 is still another structural view of UE according to one or more embodiments of the present disclosure.

Optionally, as shown in FIG. 12, the UE 900 further includes a transmission module 905 configured to transmit feedback information indicative of a configuration error to the network-side device.

Optionally, the feedback information includes any one of an RRC message, an MAC CE, or an uplink L1 control signaling.

Optionally, in case that the state indication information is information indicating that the state transition of the secondary cell configured with PUCCH resources to the third state is permitted, the determination module 902 is specifically configured to determine that the state transition of the secondary cell configured with PUCCH resources to the third state is permitted.

Figure 13:
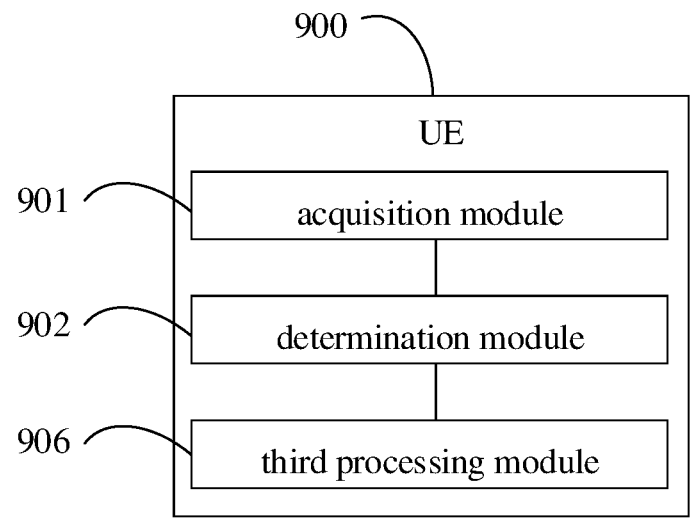
FIG. 13 is still another structural view of UE according to one or more embodiments of the present disclosure.

Optionally, as shown in FIG. 13, the UE 900 further includes a third processing module 906 configured to: after determining that the state transition of the secondary cell configured with PUCCH resources to the third state is permitted, if a state transition signaling configured by the network-side device or timer information for controlling the state transition of the secondary cell to the third state is received, perform the state transition of the third secondary cell to the third state based on the state transition signaling or the timer information; where the state transition signaling is used for the state transition of the third secondary cell to the third state, and the third secondary cell is a secondary cell configured with PUCCH resources.

Optionally, the third processing module 906 is further configured to: after the state transition of the third secondary cell to the third state, release the PUCCH resources configured for the third secondary cell; or release the PUCCH resources configured for the third secondary cell based on a PUCCH resource release indication transmitted from the network-side device.

Optionally, the third processing module 906 is further configured to: after releasing the PUCCH resources configured for the third secondary cell, transmit at least one of a CQI, a PMI, an RI, a PTI, or a CRI report on a default physical channel; or transmit at least one of an ACK or a NACK on a default physical channel; or transmit an uplink SR on a default physical channel Optionally, the third processing module 906 is further configured to: after the state transition of the third secondary cell to the third state, stop transmitting at least one of the ACK, the NACK, or the SR over the PUCCH resources configured for the third secondary cell; or transmit periodically at least one of the CQI, the PMI, the RI, the PTI, or the CRI over the PUCCH resources configured for the fourth secondary cell.

Optionally, the third processing module 906 is specifically configured to: when an on duration timer is running, or when an MAC entity is activated, transmit periodically at least one of the CQI, the PMI, the RI, the PTI, or the CRI over the PUCCH resources configured for the fourth secondary cell.

Optionally, the third processing module 906 is further configured to: after the state transition of the third secondary cell to the third state, transmit at least one of the ACK or the NACK on a default physical channel; or transmit the SR on a default physical channel.

Optionally, in case that the state indication information is information indicating that a configuration of PUCCH resources for a secondary cell in the third state is permitted, the determination module 902 is specifically configured to determine that a configuration of PUCCH resources for a secondary cell in the third state is permitted.

Figure 14:
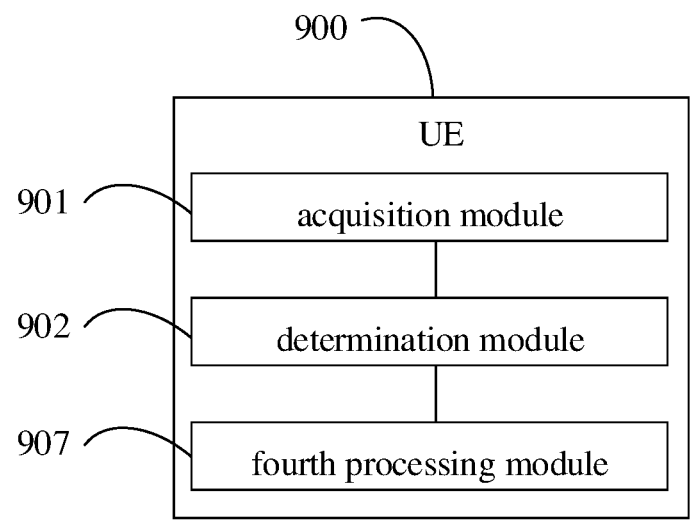
FIG. 14 is still another structural view of UE according to one or more embodiments of the present disclosure.

Optionally, as shown in FIG. 14, the UE 900 further includes a fourth processing module 907 configured to: after determining that a configuration of PUCCH resources for a secondary cell in the third state is permitted, if the resource configuration signaling configured by the network-side device is received, configure PUCCH resources to the fourth secondary cell; where the resource configuration signaling is used for configuring PUCCH resources for the fourth secondary cell, and the fourth secondary cell is a secondary cell in the third state.

Optionally, the fourth processing module 907 is further configured to: after configuring PUCCH resources for the fourth secondary cell, transmit periodically at least one of the CQI, the PMI, the RI, the PTI, or the CRI over the PUCCH resources configured for the fourth secondary cell.

Optionally, the fourth processing module 907 is specifically configured to: when an on duration timer is running, or when an MAC entity is activated, transmit periodically at least one of the CQI, the PMI, the RI, the PTI, or the CRI over the PUCCH resources configured for the fourth secondary cell.

It is to be noted that the UE 900 in embodiments of the present disclosure may be UE in any implementation of the method embodiments, and any implementation of UE in the method embodiments can be realized by the UE 900 in embodiments of the present disclosure and the same beneficial effects may be achieved. Description thereof will be omitted herein to avoid redundancy.

Figure 15:
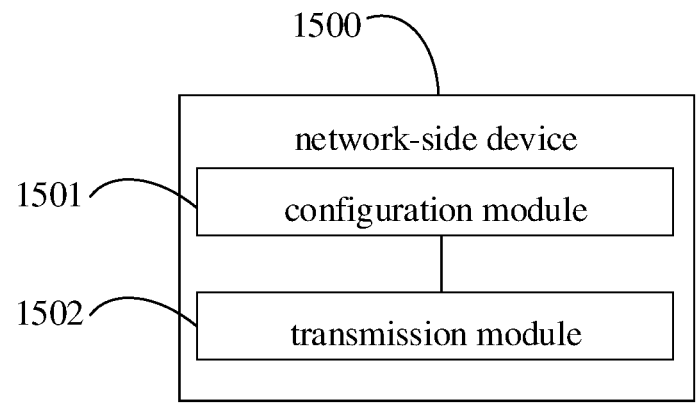
FIG. 15 is a structural view of a network-side device according to one or more embodiments of the present disclosure.

Referring to FIG. 15, a structural view of a network-side device according to one or more embodiments of the present disclosure is illustrated. As shown in FIG. 15, the network-side device 1500 includes: a configuration module 1501, configured to configure a state transition signaling, where the state transition signaling is used for the state transition of a secondary cell configured with PUCCH resources to a third state or for configuring PUCCH resources for the secondary cell in the third state; and a transmission module 1502, configured to transmit the state transition signaling to UE.

Figure 16:
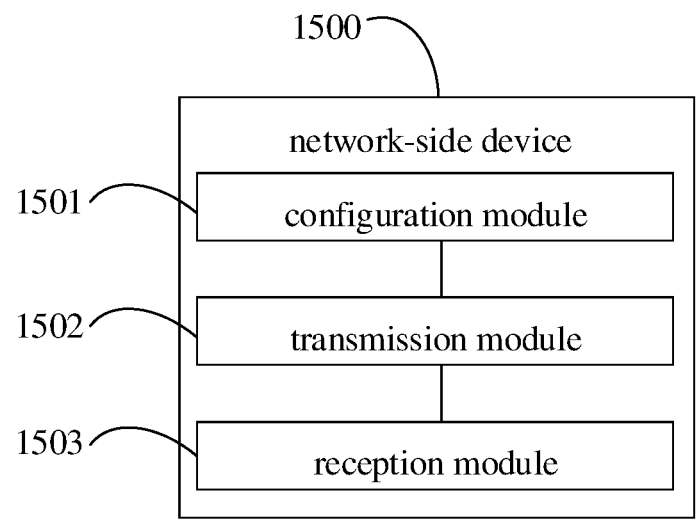
FIG. 16 is another structural view of a network-side device according to one or more embodiments of the present disclosure.

Optionally, as shown in FIG. 16, the network-side device 1500 further includes a reception module 1503 configured to: after the state transition signaling is transmitted to the user equipment UE, receive the feedback information transmitted by the UE and indicative of the configuration error of the state transition signaling.

Figure 17:
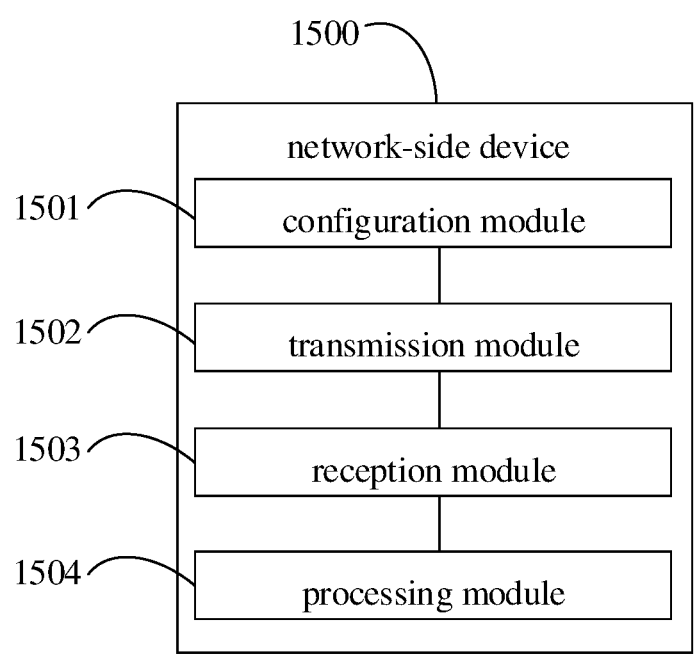
FIG. 17 is yet another structural view of a network-side device according to one or more embodiments of the present disclosure.

Optionally, as shown in FIG. 17, the network-side device 1500 further includes a processing module 1504 configured to: after receiving the feedback information transmitted by the UE and indicative of a configuration error of the state transition signaling, stop configuring the state transition signaling.

It is to be noted that the network-side device 1500 in embodiments of the present disclosure may be the network-side device in any implementation of the method embodiments, and any implementation of network-side device in the method embodiments can be realized by the network-side device 1500 in embodiments of the present disclosure and the same beneficial effects may be achieved. Description thereof will be omitted herein to avoid redundancy.

Figure 18:
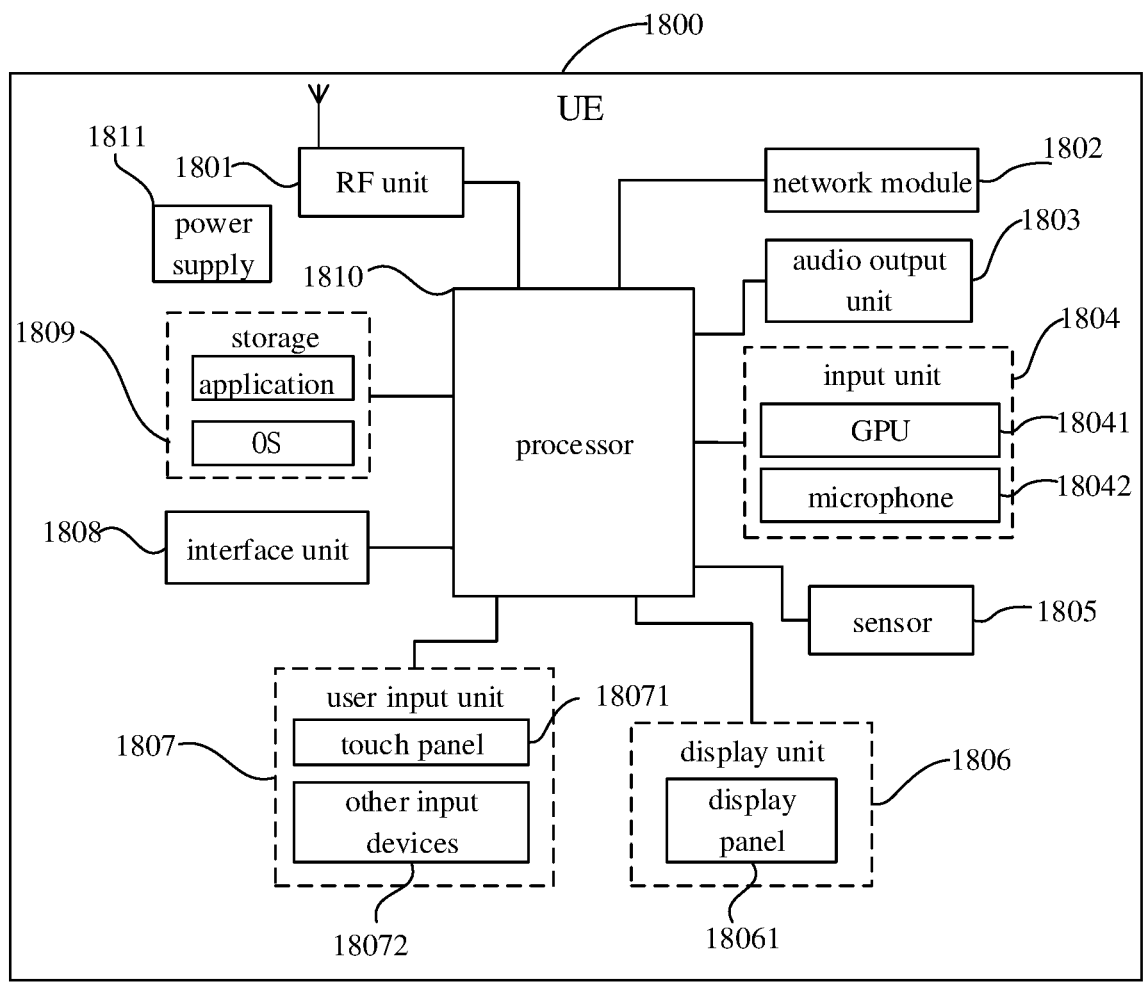
FIG. 18 is a schematic hardware structural view of UE according to one or more embodiments of the present disclosure.

Referring to FIG. 18, a schematic hardware structural view of UE according to embodiments of the present disclosure is illustrated. The UE 1800 includes, without limitation, components such as a radio-frequency (RF) unit 1801, a network module 1802, an audio output unit 1803, an input unit 1804, a sensor 1805, a display unit 1806, a user input unit 1807, an interface unit 1808, a storage 1809, a processor 1810, a power supply 1811. As appreciated by those skilled in the art, the structure of the UE shown in FIG. 18 is not intended to limit the UE. The UE may include more or fewer components than those shown in the figures, or combination of some components, or different component arrangements. In an embodiment of the present disclosure, the UE includes, without limitation, a cell phone, a tablet computer, a laptop computer, a palm computer, an in-vehicle UE, a wearable device, a pedometer, and the like.

The RF unit 1801 is configured to acquire the state indication information of the secondary cell.

The processor 1810 is configured to determine whether a transition of the state of a secondary cell configured with PUCCH resources to a third state is permitted based on the state indication information; or determine whether a configuration of PUCCH resources for a secondary cell in the third state is permitted based on the state indication information.

Optionally, in case that the state indication information is information indicating that the state transition of the secondary cell configured with PUCCH resources to the third state is not permitted, the processor 1810, in the step of determining whether the state transition of the secondary cell configured with PUCCH resources to a third state is permitted based on the state indication information, is configured to determine that the state transition of the secondary cell configured with PUCCH resources to a third state is not permitted.

Optionally, the processor 1810 is further configured to: if the state transition signaling configured by the network-side device or the timer information for controlling the state transition of the secondary cell to the third state is received, ignore the state transition signaling or the timer information; where the state transition signaling is used for the state transition of a first secondary cell to the third state, and the first secondary cell is a secondary cell configured with PUCCH resources.

Optionally, in case that the state indication information is information indicating that a configuration of PUCCH resources for a secondary cell in the third state is not permitted, the processor 1810, in the step of determining whether a configuration of PUCCH resources for a secondary cell in the third state is permitted based on the state indication information, is configured to determine that a configuration of PUCCH resources for a secondary cell in the third state is not permitted.

Optionally, the processor 1810 is further configured to: if resource configuration signaling configured by the network-side device is received, ignore the resource configuration signaling; where the resource configuration signaling is used for configuring PUCCH resources for a second secondary cell, and the second secondary cell is a secondary cell that is in the third state and is not configured with PUCCH resources.

Optionally, the processor 1810 is further configured to transmit the feedback information indicative of configuration error to the network-side device.

Optionally, the feedback information includes any one of an RRC message, an MAC CE, or an uplink L1 control signaling.

Optionally, in case that the state indication information is the information indicating that the state transition of the secondary cell configured with PUCCH resources to the third state is permitted, the processor 1810, in the step of determining whether the state transition of the secondary cell configured with PUCCH resources to a third state is permitted based on the state indication information, is configured to determine that the state transition of the secondary cell configured with PUCCH resources to the third state is permitted.

Optionally, the processor 1810 is further configured to: if the state transition signaling configured by the network-side device or the timer information for controlling the state transition of the secondary cell to the third state is received, perform the state transition of a third secondary cell to the third state based on the state transition signaling or the timer information; where the state transition signaling is used for the state transition of the third secondary cell to the third state, and the third secondary cell is a secondary cell configured with PUCCH resources.

Optionally, the processor 1810 is further configured to: release the PUCCH resources configured for the third secondary cell; or release the PUCCH resources configured for the third secondary cell based on a PUCCH resource release indication transmitted from the network-side device.

Optionally, the processor 1810 is further configured to: transmit at least one of a CQI, a PMI, an RI, a PTI, or a CRI report on a default physical channel; or transmit at least one of an acknowledgement signal (ACK) or a negative acknowledgement signal (NACK) on a default physical channel; or transmit an uplink scheduling request (SR) on a default physical channel.

Optionally, the processor 1810 is further configured to: stop transmitting at least one of the ACK, the NACK, or the SR over the PUCCH resources configured for the third secondary cell; or transmit periodically at least one of the CQI, the PMI, the RI, the PTI, or the CRI over the PUCCH resources configured for the third secondary cell.

Optionally, the processor 1810, in the step of transmitting periodically at least one of the CQI, the PMI, the RI, the PTI, or the CRI over the PUCCH resources configured for the third secondary cell, is configured to: when an on duration timer is running, or when an MAC entity is activated, transmit periodically at least one of the CQI, the PMI, the RI, the PTI, or the CRI over the PUCCH resources configured for the third secondary cell.

Optionally, the processor 1810 is further configured to: transmit at least one of the ACK or the NACK on a default physical channel; or transmit the SR on a default physical channel.

Optionally, in case that the state indication information is information indicating that a configuration of PUCCH resources for a secondary cell in the third state is permitted, the processor 1810, in the step of determining whether a configuration of PUCCH resources for a secondary cell in the third state is permitted based on the state indication information, is configured to determine that a configuration of PUCCH resources for a secondary cell in the third state is permitted.

Optionally, the processor 1810 is further configured to: if the resource configuration signaling configured by the network-side device is received, configure PUCCH resources to a fourth secondary cell; where the resource configuration signaling is used for configuring PUCCH resources for the fourth secondary cell, and the fourth secondary cell is a secondary cell that is in the third state and is not configured with PUCCH resources.

Optionally, the processor 1810 is further configured to transmit periodically at least one of the CQI, the PMI, the RI, the PTI, or the CRI over the PUCCH resources configured for the fourth secondary cell.

Optionally, the processor 1810, in the step of transmitting periodically at least one of the CQI, the PMI, the RI, the PTI, or the CRI over the PUCCH resources configured for the fourth secondary cell, is configured to: when an on duration timer is running, or when an MAC entity is activated, transmit periodically at least one of the CQI, the PMI, the RI, the PTI, or the CRI over the PUCCH resources configured for the fourth secondary cell.

In an embodiment of the present disclosure, it is determined based on the state indication information whether the secondary cell configured with PUCCH resources is permitted to enter a third state and whether PUCCH resources are permitted to be configured for a secondary cell in the third state. As such, after the third state is introduced, it is possible to reduce the latency occurring during transition of the secondary cell between the activated state and the deactivated state, and improve the compatibility of the communication system after the third state is introduced.

It is understood, in some embodiments of the present disclosure, the RF unit 1801 may be configured to receive and transmit signals during information transmission or during a call. Specifically, the RF unit 1801 receives downlink data from a base station and transfers the data to the processor 1810 for processing; and the RF unit 1801 transmits uplink data to the base station. Generally, the RF unit 1801 includes, but is not limited to: an antenna, at least one amplifier, a transceiver, a coupler, a low noise amplifier, a duplexer and the like. In addition, the RF unit 1801 may be configured to communicate with a network or other device through a wireless communication system.

By means of the network module 1802, the UE provides user with wireless broadband Internet access, such as sending and receiving emails, browsing webpages and accessing streamed media.

The audio output unit 1803 may convert audio data received by the RF unit 1801 or network module 1802 or stored in the storage 1809 into audio signals and output audibly. Moreover, the audio output unit 1803 may provide audio outputs associated with the specific functions performed by the UE 1800 (such as, incoming call ringtone, message received ringtone). The audio output unit 1803 includes a speaker, a buzzer, a telephone receiver and the like.

The input unit 1804 is configured to receive audio or video signals. The input unit 1804 may include a graphics processing unit (GPU) 18041 and a microphone 18042. The GPU 18041 processes image data such as still picture or video acquired by an image capture device (e.g., a camera) in a video capture mode or image capture mode. The processed image frames may be displayed on the display unit 1806. The image frames processed by the GPU 18041 may be stored in the storage 1809 (or other storage medium) or sent via the RF unit 1801 or network module 1802. The microphone 18042 may pick up sound and convert it into audio data. In a phone call mode, the processed audio data may be converted into a format suitable for transmission to a mobile communication base station via the RF unit 1801 and output.

The UE 1800 further includes at least one sensor 1805, for example, an optical sensor, a motion sensor, among others. In specific, the optical sensor includes an ambient light sensor and a proximity sensor. The ambient light sensor may adjust a brightness of a display panel 18061 according to the ambient light conditions. The proximity sensor may deactivate the display panel 18061 and/or a backlight when the UE 1800 is moved close to an ear. As a kind of motion sensor, an acceleration sensor may detect a magnitude of acceleration on each direction (generally, on three axes). While remaining still, the acceleration sensor may detect the magnitude and direction of gravity, which may be used in posture identification of the UE (e.g., switch between portrait and landscape modes, related games, magnetometer posture calibration), vibration identification related function (e.g., pedometer, tap) and the like; the sensor 1805 may further include a fingerprint sensor, a pressure sensor, an iris sensor, a molecule sensor, a gyroscope, a barometer, a hygrometer, a thermometer, an infrared sensor and the like, which is not described in detail herein.

The display unit 1806 is configured to display information input by or presented to a user. The display unit 1806 may include a display panel 18061. The display panel 18061 may be constructed in form of liquid crystal display (LCD), organic light-emitting diode (OLED) and the like.

The user input unit 1807 may be configured to receive input numerical information or character information, and generate key signal inputs related to the user setting and function control of the UE. In specific, the user input unit 1807 includes a touch panel 18071 and other input devices 18072. The touch panel 18071, also known as touch screen, may detect the touches thereon or in the vicinity thereof performed by the user (such as touch operations performed on or in the vicinity of the touch panel 18071 by the user using a finger, stylus or any other suitable object or accessory). The touch panel 18071 may include a touch detector and a touch controller. The touch detector detects the position where the user touched and the signal resulting from the touch operation, and conveys the signal to the touch controller; the touch controller receives the touch information from the touch detector, converts the information into coordinates of the touch and conveys the coordinates to the processor 1810, as well as receives and executes the commands from the processor 1810. Further, the touch panel 18071 may be implemented in a variety of modes, such as resistance, capacitance, infrared and surface acoustic wave. In addition to the touch panel 18071, the user input unit 1807 may include other input devices 18072. In specific, the other input devices 18072 may include, but is not limited to: physical keyboard, functional keys (such as volume button, switch button, etc.), track ball, mouse, joystick, which is not described in detail herein.

Further, the touch panel 18071 may overlie the display panel 18061. Having detected a touch operation thereon or in the vicinity thereof, the touch panel 18071 conveys the detected touch signal to the processor 1810 to categorize the touch event, and the processor 1810 provides corresponding visual output on the display panel 18061 in accordance with the category of the touch event. Although, in FIG. 18, the touch panel 18071 and the display panel 18061 are provided as two separate parts to implement the input and output function of the UE, the touch panel 18071 and the display panel 18061 may be integrated to implement the input and output function of the UE in some embodiments, which is not limited herein.

The interface unit 1808 is an interface by which an external device is connected to the UE 1800. For example, the external device may include a wired or wireless headset port, an external power supply (or battery charger) port, a wired or wireless data port, a storage card port, a port configured to be connected to a device having an identification module, an audio input/output (I/O) port, a video I/O port, an earphone port and the like. The interface unit 1808 may be configured to receive input (e.g., data information, power, etc.) from the external device and transfer the received input to one or more components in the UE 1800, or may be configured to transmit data between the UE 1800 and the external device.

The storage 1809 may be configured to store software program and other data. The storage 1809 may include generally a program storage area and a data storage area. The program storage area may store an operating system (OS), an application program required for at least one function (such as an audio playing function and an image playback function) and the like; the data storage area may store data (e.g., audio data, phone book, etc.) created according to usage of a mobile phone, and the like. Moreover, the storage 1809 may include a cache, as well as a non-volatile storage, such as at least one disk storage device, flash memory or other non-volatile solid-state storage devices.

The processor 1810 is a control center of the UE. The processor 1810 is connected to various parts of the entire UE through various interfaces and lines, and performs various functions of the UE and processes data by executing or running software programs and/or modules stored in the storage 1809 and invoking data stored in the storage 1809, so as to achieve an overall monitoring of the UE. The processor 1810 may include one or more processing units; optionally, the processor 1810 may integrate an application processor and a modem, wherein the application processor is mainly responsible for executing an operating system, a user interface, an application program, etc., while the modem is mainly responsible for handling wireless communication. It is understood, the modem may be not integrated in the processor 1810.

The UE 1800 may further include a power supply 1811 (e.g., a battery) providing power to various components. Optionally, the power supply 1811 may be logically connected to the processor 1810 via a power management system, such that functions such as charging management, discharging management and power management may be achieved through the power management system.

In addition, the UE 1800 includes some functional modules not shown, which shall not be described in detail herein.

Optionally, the present disclosure further provides, in some embodiments, UE. The UE includes a processor 1810, a storage 1809, a computer program stored in the storage 1809 and configured to be executed by the processor 1810. The computer program, when executed by the processor 1810, performs various processes in embodiments of the processing method for secondary cell state transition described above and can achieve the same technical effects. Detailed description thereof will be omitted herein to avoid repetition.

Figure 19:
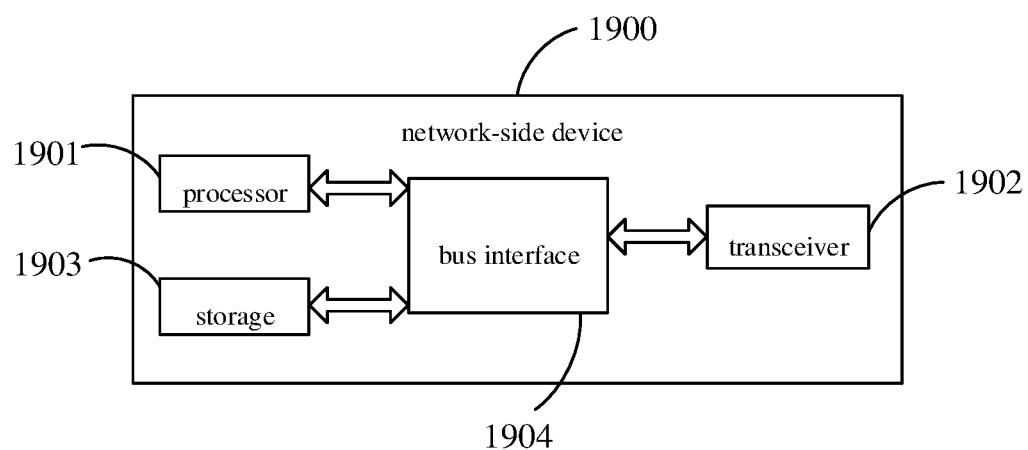
FIG. 19 is still another structural view of a network-side device according to one or more embodiments of the present disclosure.

Referring to FIG. 19, a structural view of another network-side device according to one or more embodiments of the present disclosure is illustrated. As shown in FIG. 19, the network-side device 1900 includes a processor 1901, a transceiver 1902, a storage 1903, and a bus interface 1904.

The processor 1901 is configured to read a program in the storage 1903 to perform the process of: configuring a state transition signaling, where the state transition signaling is used for the state transition of a secondary cell configured with PUCCH resources to a third state or for configuring PUCCH resources for a secondary cell in the third state.

The transceiver 1902 is configured to transmit the state transition signaling to the UE.

In FIG. 19, a bus architecture may include any number of interconnected buses and bridges, and connects various circuits including one or more processors represented by the processor 1901 and storage represented by the storage 1903. The bus architecture may also connect various other circuits such as peripherals, voltage regulators and power management circuits, which is well known in the art. Therefore, a detailed description thereof is omitted herein. A bus interface provides an interface. The transceiver 1902 may be one or more elements, such as a receiver and a transmitter, to allow for communication with various other apparatuses on the transmission medium. For different user equipment, the user interface 1904 may also be an interface that can connect required devices externally or internally. The connected devices include, without limitation, a keypad, a display, a speaker, a microphone, a joystick, and the like.

The processor 1901 is in charge of management of the bus architecture and routine processing, and the storage 1903 can store data used by the processor 1901 during its operation.

Optionally, the transceiver 1902 is further configured to receive feedback information transmitted by the UE and indicative of a configuration error of the state transition signaling.

Optionally, the processor 1901 is further configured to stop configuring the state transition signaling.

It is to be noted that the network-side device 1900 in this embodiment can be a network-side device in any implementation of the method embodiment in the embodiments of the present disclosure, and any implementation of the network-side device in the method embodiments of the present disclosure can be realized by the network-side device 1900 in this embodiment and the same beneficial effects may be achieved, and detailed description thereof will be omitted herein.

The present disclosure also provides in some embodiments a computer-readable storage medium storing therein a computer program. When executed by a processor, the computer program implements various processes of the embodiment of the processing method for secondary cell state transition described above corresponding to the network-side device or UE, and the same technical effect may be achieved. In order to avoid repetition, detailed description thereof will be omitted herein. The computer readable storage medium is, for example, a read-only memory (ROM), a random access memory (RAM), a magnetic disk or an optical disc, or the like.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in many cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by UE (such as a handset, a computer, a server, an air conditioner or a network device) to perform the method according to the embodiments of the present disclosure.

Described above are only specific implementations of the present disclosure, but the scope of the present disclosure is not limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A processing method for secondary cell (SCell) state transition, applied to user equipment (UE), comprising:
   acquiring state indication information of an SCell;
   determining whether a state transition of the SCell configured with physical uplink control channel (PUCCH) resources to a third state is permitted based on the state indication information, or
   determining whether a configuration of the PUCCH resources for the SCell in the third state is permitted based on the state indication information;
   wherein the third state is a state in which periodic channel quality indicator (CQI) reporting based on a cell reference signal (CRS) is permitted and a physical downlink control channel (PDCCH) is not monitored.

2. The processing method of claim 1, wherein in case that the state indication information is information indicating that the state transition of the SCell configured with PUCCH resources to the third state is not permitted,
   the determining whether the state transition of the SCell configured with PUCCH resources to the third state is permitted based on the state indication information comprises:
   determining that the state transition of the SCell configured with PUCCH resources to the third state is not permitted;
   or,
   in case that the state indication information is information indicating that the configuration of PUCCH resources for the SCell in the third state is not permitted,
   the determining whether the configuration of PUCCH resources for the SCell in the third state is permitted based on the state indication information comprises:
   determining that the configuration of PUCCH resources for the SCell in the third state is not permitted;
   or,
   in case that the state indication information is information indicating that the state transition of the SCell configured with PUCCH resources to the third state is permitted, the determining whether the state transition of the SCell configured with PUCCH resources to the third state is permitted based on the state indication information comprises:
  determining that the state transition of the SCell configured with PUCCH resources to the third state is permitted;
or,
in case that the state indication information is information indicating that the configuration of PUCCH resources for the SCell in the third state is permitted,
the determining whether the configuration of PUCCH resources for the SCell in the third state is permitted based on the state indication information comprises:
  determining that the configuration of PUCCH resources for the SCell in the third state is permitted.

3. The processing method of claim 2, wherein, subsequent to the determining that the state transition of the SCell configured with PUCCH resources to the third state is not permitted, the method further comprises:
  if a state transition signaling configured by a network-side device or timer information for controlling the state transition of the SCell to the third state is received, ignoring the state transition signaling or the timer information;
  wherein the state transition signaling is used for the state transition of a first SCell to the third state, and the first SCell is an SCell configured with PUCCH resources.

4. The processing method of claim 3, further comprising:
  transmitting feedback information indicative of a configuration error to the network-side device.

5. The processing method of claim 4, wherein the feedback information comprises any one of a radio resource control (RRC) message, a media access control (MAC) control element (CE), or an uplink L1 control signaling.

6. The processing method of claim 2, wherein, subsequent to the determining that the configuration of PUCCH resources for the SCell in the third state is not permitted, the method further comprises:
  if a resource configuration signaling configured by a network-side device is received, ignoring the resource configuration signaling;
  wherein the resource configuration signaling is used for configuring PUCCH resources for a second SCell, and the second SCell is an SCell that is in the third state and is not configured with PUCCH resources.

7. The processing method of claim 2, wherein, subsequent to the determining that the state transition of the SCell configured with PUCCH resources to the third state is permitted, the method further comprises:
  if a state transition signaling configured by a network-side device or timer information for controlling the state transition of the SCell to the third state is received, performing the state transition of a third SCell to the third state based on the state transition signaling or the timer information;
  wherein the state transition signaling is used for the state transition of the third SCell to the third state, and the third SCell is an SCell configured with PUCCH resources.

8. The processing method of claim 7, wherein, subsequent to the performing the state transition of the third SCell to the third state, the method further comprises:
  releasing the PUCCH resources configured for the third SCell; or releasing the PUCCH resources configured for the third SCell based on a PUCCH resource release indication transmitted by the network-side device.

9. The processing method of claim 8, wherein, subsequent to the releasing the PUCCH resources configured for the third SCell, the method further comprises:
  transmitting at least one of a channel quality indicator (CQI), a precoding matrix indicator (PMI), a rank indicator (RI), a payload type identifier (PTI), or a channel state information reference signal (CSI-RS) resource indication (CRI) report on a default physical channel; or
  transmitting at least one of an acknowledgement signal (ACK) or a negative acknowledgement signal (NACK) on a default physical channel; or
  transmitting an uplink scheduling request (SR) on a default physical channel.

10. The processing method of claim 7, wherein, subsequent to the performing the state transition of the third SCell to the third state, the method further comprises:
  stopping transmitting at least one of an acknowledgement signal (ACK), a negative acknowledgement signal (NACK), or an uplink scheduling request (SR) over the PUCCH resources configured for the third SCell; or
  transmitting periodically at least one of a channel quality indicator (CQI), a precoding matrix indicator (PMI), a rank indicator (RI), a payload type identifier (PTI), or a channel state information reference signal (CSI-RS) resource indication (CRI) over the PUCCH resources configured for the third SCell.

11. The processing method of claim 10, wherein the transmitting periodically the at least one of the CQI, the PMI, the RI, the PTI, or the CRI over the PUCCH resources configured for the third SCell comprises:
  when an on duration timer is running, or when a media access control (MAC) entity is activated, transmitting periodically the at least one of the CQI, the PMI, the RI, the PTI, or the CRI over the PUCCH resources configured for the third SCell.

12. The processing method of claim 10, wherein, subsequent to the performing the state transition of the third SCell to the third state, the method further comprises:
  transmitting at least one of an ACK or a NACK on a default physical channel; or
  transmitting an SR on a default physical channel.

13. The processing method of claim 2, wherein, subsequent to the determining that the configuration of PUCCH resources for the SCell in the third state is permitted, the method further comprises:
  if a resource configuration signaling configured by a network-side device is received, configuring PUCCH resources for a fourth SCell;
  wherein the resource configuration signaling is used for configuring PUCCH resources for the fourth SCell, and the fourth SCell is an SCell that is in the third state and is not configured with PUCCH resources.

14. The processing method of claim 13, wherein, subsequent to the configuring PUCCH resources for the fourth SCell, the method further comprises:
  transmitting periodically at least one of a channel quality indicator (CQI), a precoding matrix indicator (PMI), a rank indicator (RI), a payload type identifier (PTI), or a channel state information reference signal (CSI-RS) resource indication (CRI) over the PUCCH resources configured for the fourth SCell.

15. The processing method of claim 14, wherein the transmitting periodically the at least one of the CQI, the PMI, the RI, the PTI, or the CRI over the PUCCH resources configured for the fourth SCell comprises:

when an on duration timer is running, or when a media access control (MAC) entity is activated, transmitting periodically the at least one of the CQI, the PMI, the RI, the PTI, or the CRI over the PUCCH resources configured for the fourth SCell.

16. User equipment (UE), comprising: a storage, a processor, and a computer program stored in the storage and configured to be executed by the processor, wherein the processor is configured to execute the computer program, to implement the steps in the processing method for SCell state transition according to claim 1.

17. A processing method for secondary cell (SCell) state transition, applied to a network-side device, comprising:

configuring a state transition signaling, wherein the state transition signaling is used for the state transition of an SCell configured with physical uplink control channel (PUCCH) resources to a third state or for configuring PUCCH resources for the SCell in the third state;

transmitting the state transition signaling to a user equipment (UE);

wherein the third state is a state in which periodic channel quality indicator (CQI) reporting based on a cell reference signal (CRS) is permitted and a physical downlink control channel (PDCCH) is not monitored.

18. The processing method of claim 17, wherein, subsequent to the transmitting the state transition signaling to the UE, the method further comprises:

receiving feedback information transmitted by the UE and indicative of a configuration error of the state transition signaling.

19. The processing method of claim 18, wherein, subsequent to the receiving the feedback information transmitted by the UE and indicative of the configuration error of the state transition signaling, the method further comprises:

stopping configuring the state transition signaling.

20. A network-side device, comprising: a storage, a processor, and a computer program stored in the storage and configured to be executed by the processor, wherein the processor is configured to execute the computer program, to implement the steps in the processing method for secondary cell (SCell) state transition according to claim 17.

* * * * *